US009602798B2

(12) United States Patent
Suh et al.

(10) Patent No.: US 9,602,798 B2
(45) Date of Patent: Mar. 21, 2017

(54) METHOD AND APPARATUS FOR PROCESSING A 3D SERVICE

(75) Inventors: Jongyeul Suh, Seoul (KR); Jeehyun Choe, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 516 days.

(21) Appl. No.: 14/127,107

(22) PCT Filed: Jul. 16, 2012

(86) PCT No.: PCT/KR2012/005650
§ 371 (c)(1),
(2), (4) Date: Dec. 17, 2013

(87) PCT Pub. No.: WO2013/012227
PCT Pub. Date: Jan. 24, 2013

(65) Prior Publication Data
US 2014/0132718 A1   May 15, 2014

(51) Int. Cl.
*H04N 15/00* (2006.01)
*H04N 13/00* (2006.01)
*H04N 21/434* (2011.01)
*H04N 21/81* (2011.01)
(Continued)

(52) U.S. Cl.
CPC ..... *H04N 13/0011* (2013.01); *H04N 13/0066* (2013.01); *H04N 21/4345* (2013.01); *H04N 21/816* (2013.01); *H04N 21/234327* (2013.01); *H04N 21/8451* (2013.01); *H04N 2213/005* (2013.01)

(58) Field of Classification Search
CPC ........... H04N 13/0055; H04N 13/0239; H04N 19/00769; H04N 13/0011; H04N 13/0066; H04N 21/4345; H04N 21/816; H04N 21/23427; H04N 21/8451; H04N 2213/005
USPC ......................................................... 348/43
See application file for complete search history.

(56) References Cited

U.S. PATENT DOCUMENTS

2006/0294171 A1   12/2006   Bossen et al.
2010/0046612 A1   2/2010   Sun et al.
(Continued)

FOREIGN PATENT DOCUMENTS

EP            2360930 A1       8/2011
KR       1020070058302         6/2007
(Continued)

*Primary Examiner* — Michael Lee
(74) *Attorney, Agent, or Firm* — Dentons US LLP

(57) ABSTRACT

The present description discloses a method and apparatus for processing a 3D service. Here, a 3D service apparatus according to one example of the present invention comprises: a receiving unit which receives a broadcast signal including the 3D service; an SI processing unit which extracts SI information on the 3D service from the broadcast signal and decodes the extracted information; a first processing unit which decodes 3D view data and depth data; a second processing unit which uses, as an input, the decoded signal outputted from the first processing unit and generates a virtual view of a certain time point on the basis of the decoded SI information; and an output formatter which generates 3D service data on the basis of the virtual view of the certain time point generated by the second processing unit, and outputs the generated 3D service data.

14 Claims, 18 Drawing Sheets

(51) Int. Cl.
  *H04N 21/2343* (2011.01)
  *H04N 21/845* (2011.01)

(56) References Cited

U.S. PATENT DOCUMENTS

2011/0148858 A1* 6/2011 Ni .................. H04N 13/0011
                                                    345/419
2012/0056981 A1* 3/2012 Tian ................ H04N 19/597
                                                     348/42

FOREIGN PATENT DOCUMENTS

| KR | 1020100018802 | 2/2010 |
|----|---------------|--------|
| KR | 1020100085188 | 7/2010 |
| WO | 2008011501 A2 | 1/2008 |
| WO | 2010-024919 A1 | 3/2010 |
| WO | 2010-071283 A1 | 6/2010 |
| WO | 2010-071291 A1 | 6/2010 |
| WO | 2010076933 | 7/2010 |
| WO | 2011-046338 A2 | 4/2011 |

* cited by examiner

FIG. 4

| Syntax | No. of bits | Format |
|---|---|---|
| view_synthesis_descriptor ( ) { | | |
| descriptor_tag | 8 | 0xTBD |
| descriptor_length | 8 | uimsbf |
| for (j=0; j< N; j++) { | | |
| left_view_flag | 1 | bslbf |
| depth_type | 2 | uimsbf |
| for (k=0; k<num_filters; k++) { | | |
| filter_type | 3 | uimsbf |
| filter_usage | 2 | uimsbf |
| num_filter_tap | 8 | uimsbf |
| for (i =0; i < num_filter_tap; i++) { | | |
| coeff1 | 8 | simsbf |
| coeff2 | 8 | uimsbf |
| } | | |
| } | | |
| depth_near | 16 | |
| depth_far | 16 | |
| synthesis_option | 8 | uimsbf |
| if (synthesis_option==0x00) { | | |
| camera_intrinsic_info ( ) | | |
| camera_extrinsic_info ( ) | | |
| } | | |
| else if (synthesis_option==0x01) { | | |
| focal_length | 16 | uimsbf |
| baseline_distance | 16 | uimsbf |
| principal_point_offset_distance | 16 | uimsbf |
| } | | |
| merge_option_included_flag | 1 | bslbf |
| if (merge_option_included_flag==1) { | | |
| depth_threshold | 16 | uimsbf |
| hole_count_threshold | 16 | uimsbf |
| } | | |
| } | | |
| } | | |

FIG. 5

| focal_length_x[i] | radial_distortion[i] | principal_point_x[i] |
|---|---|---|
| 0.0 | focal_length_y[i] | principal_point_y[i] |
| 0.0 | 0.0 | 1.0 |

(a)

| r_11[i] | r_12[i] | r_13[i] |
|---|---|---|
| r_21[i] | r_22[i] | r_23[i] |
| r_31[i] | r_32[i] | r_33[i] |

| t_1[i] |
|---|
| t_2[i] |
| t_3[i] |

```
PMT

......

program_number = 0x0002

......

stream_type = 0x1B (AVC video, View 1)

elementary_PID = 0x0090 view_synthesis_descriptor (option 2)

......

stream_type = 0x20 (MVC extension, View 2)

elementary_PID = 0x00A0 view_synthesis_descriptor (option 2)

......

stream_type = 0x26 (depth stream, View 1)

elementary_PID = 0x0091 view_synthesis_descriptor (option 1)

......

stream_type = 0x26 (depth stream, View 2)

elementary_PID = 0x00A1 view_synthesis_descriptor (option 1)

| Syntax | Number of bits | Identifier |
|---|---|---|
| service_description_section ( ) { | | |
|    table_id | 8 | uimsbf |
|    section_syntax_indicator | 1 | bslbf |
|    reserved_future_use | 1 | bslbf |
|    reserved | 2 | bslbf |
|    section_length | 12 | uimsbf |
|    transport_stream_id | 16 | uimsbf |
|    reserved | 2 | bslbf |
|    version_number | 5 | uimsbf |
|    current_next_indicator | 1 | bslbf |
|    section_number | 8 | uimsbf |
|    last_section_number | 8 | uimsbf |
|    original_network_id | 16 | uimsbf |
|    reserved_future_use | 8 | bslbf |
|    for ( i=0 ; i<N ; i++ ) { | | |
|      service_id | 16 | uimsbf |
|      reserved_future_use | 6 | bslbf |
|      EIT_schedule_flag | 1 | bslbf |
|      EIT_present_following_flag | 1 | bslbf |
|      running_status | 3 | uimsbf |
|      free_CA_mode | 1 | bslbf |
|      descriptors_loop_length | 12 | uimsbf |
|      for ( j=0 ; j<N ; j++ ) { | | |
|        descriptor ( ) | | |
|      } | | |
|    } | | |
|    CRC_32 | 32 | rpochof |
| } | | | view synthesis descriptor position

FIG. 9

| Syntax | No. of bits | Format |
|---|---|---|
| user_data_registered_itu_t_t35 ( ) {<br>    itu_t_t35_country_code<br>    itu_t_t35_provider_code<br>    user_identifier<br>    user_structure ( )<br>} | <br>8<br>16<br>32 | <br>bslbf<br>bslbf<br>bslbf |

FIG. 10

| Syntax | Format |
|---|---|
| view_synthesis_info_data ( ) { | |
|     view_synthesis_info_id | ue(v) |
|     view_synthesis_info_cancel_flag | u(1) |
|     if (view_synthesis_info_cancel_flag = '0') { | |
|     for (j=0; j< N; j++) { | |
|         left_view_flag | u(1) |
|         depth_type | u(2) |
|         for (k=0; k<num_filters; k++) { | |
|             filter_type | u(3) |
|             filter_usage | u(2) |
|             num_filter_tap | u(4) |
|             for (i =0; i < num_filter_tap; i++) { | |
|                 coeff1 | i(16) |
|                 coeff2 | u(16) |
|             } | |
|         } | |
|         depth_near | i(16) |
|         depth_far | i(16) |
|         synthesis_option | u(8) |
|         if (synthesis_option==0x00) { | |
|             camera_intrinsic_info ( ) | |
|             camera_extrinsic_info ( ) | |
|         } | |
|         else if (synthesis_option==0x01) { | |
|             focal_length | u(16) |
|             baseline_distance | u(16) |
|             principal_point_offset_distance | u(16) |
|         } | |
|         merge_option_included_flag | u(1) |
|         if (merge_option_included_flag==1) { | |
|             depth_threshold | u(16) |
|             hole_count_threshold | u(16) |
|         } | |
|     } | |
|     } | |
| } | |

FIG. 11

| Syntax | No. of bits | Format |
|---|---|---|
| view_synthesis_SEI_descriptor ( ) { | | |
|     descriptor_tag | 8 | 0xTBD |
|     descriptor_length | 8 | uimsbf |
|     reserved | 6 | '111111' |
|     view_synthesis_info_SEI_message_exist_flag | 1 | bslbf |
|     full_synthesis_mode_supported_flag | 1 | bslbf |
| } | | |

FIG. 13

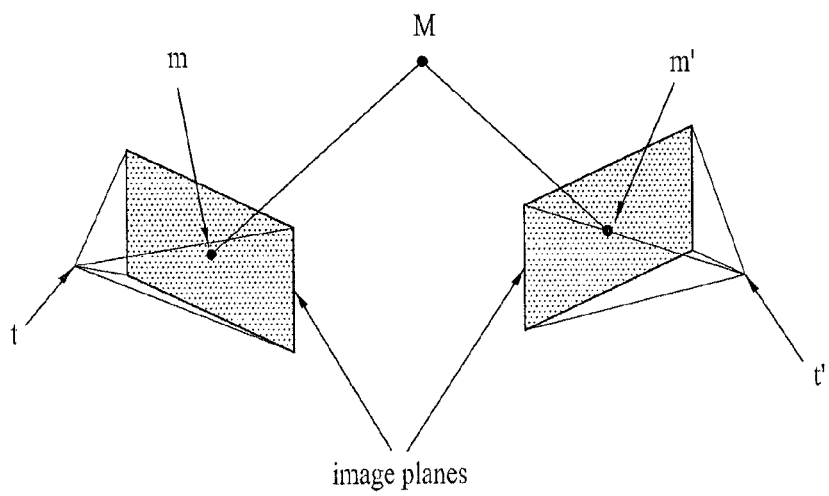

M : point on 3D world coordinate m, m' : projections of M on the image planes t, t' : centers of camers (a)

$$s\tilde{m} = A \cdot P \cdot \begin{bmatrix} R & t \\ 0 & 1 \end{bmatrix} \cdot \tilde{M}$$

(b)

$$s'\tilde{m}' = A' \cdot P \cdot \begin{bmatrix} R' & t' \\ 0 & 1 \end{bmatrix} \cdot \tilde{M}$$

(c)

$$Z'\tilde{m}' = Z \cdot A' \cdot R' \cdot R^{-1} \cdot A^{-1} \tilde{m} - A' \cdot R' \cdot R^{-1} \cdot t + A \cdot t'$$

(d)

FIG. 14
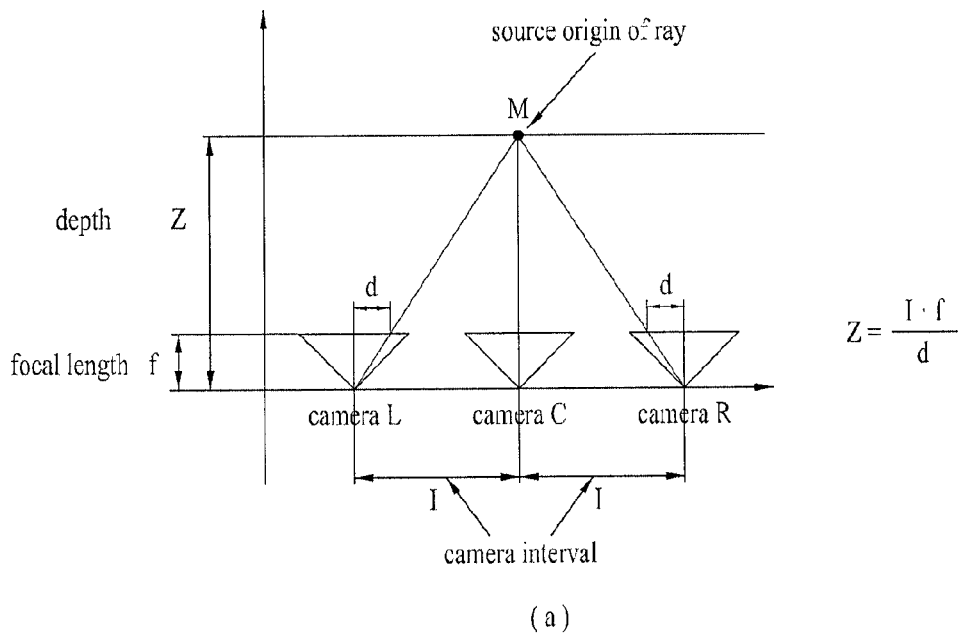
(a)
$$Z = \frac{1}{\frac{Y}{255}\left(\frac{1}{Z_{near}} - \frac{1}{Z_{far}}\right) + \frac{1}{Z_{far}}}$$
(b)
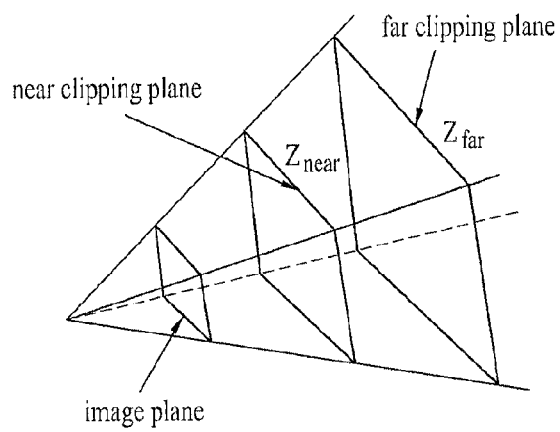
(c)
$$d = \frac{f \cdot 1}{z} + du$$
(d)

FIG. 15

|  | DepthType == 0 | DepthType == 1 |
|---|---|---|
| characteristic | Applicable to any 1D parallel images | Applicable to only images that any objects have positive depth from the origin of 3D space (restriction) |
| range of Z value | can take (-) value as well as (+) value | can take (+) value only |
| Equation (z-v) Depth vs. intensity | $Z = T_z + \dfrac{v}{255.0} \cdot \left( \dfrac{1.0}{Z_{near}} - \dfrac{1.0}{Z_{far}} \right) + \dfrac{1.0}{Z_{far}}$ | $Z = \dfrac{1.0}{\dfrac{v}{255.0} \cdot \left( \dfrac{1.0}{Z_{near}} - \dfrac{1.0}{Z_{far}} \right) + \dfrac{1.0}{Z_{far}}}$ |
| Equation (v-d) Intensity vs. disparity | $v = 255 \cdot \dfrac{d - d_{min}}{d_{max} - d_{min}}$ | $v = 255 \cdot \dfrac{\{T_z * (d_{max} + \Delta d) + f \cdot 1\} * (d - d_{min})}{\{T_z * (d + \Delta d) + f \cdot 1\} * (d_{max} - d_{min})}$ |

FIG. 16
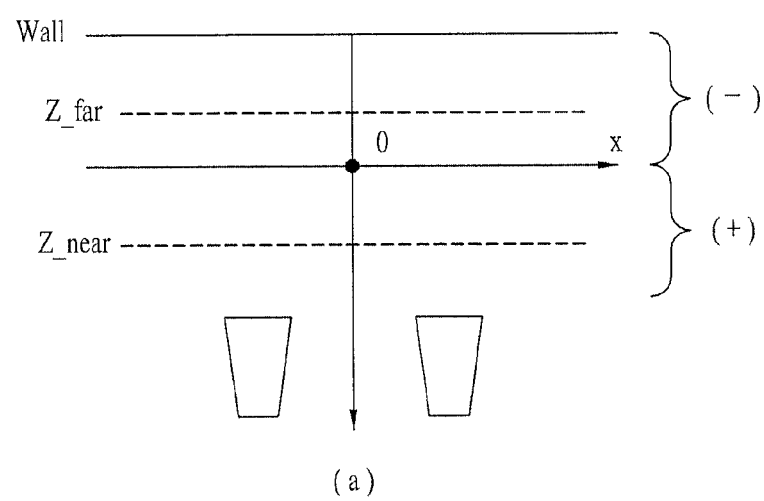
(a)
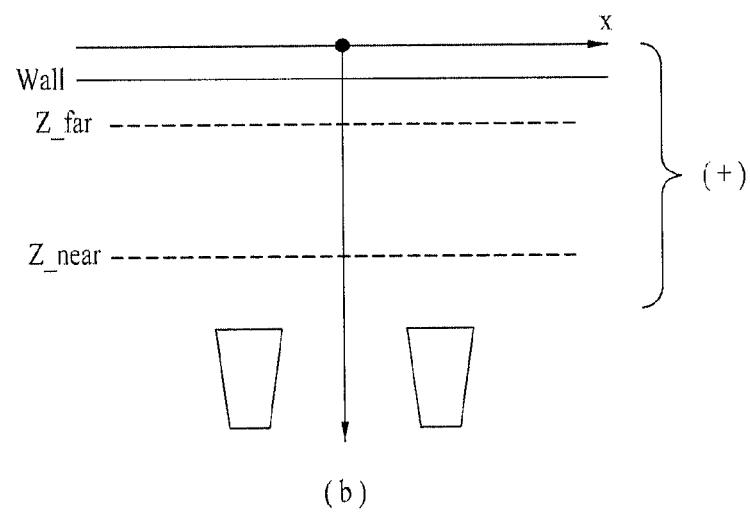
(b)

FIG. 18

| r_11[i] | r_12[i] | r_13[i] |
|---------|---------|---------|
| r_21[i] | r_22[i] | r_23[i] |
| r_31[i] | r_32[i] | r_33[i] |

(a)

| t_1[i] |
|--------|
| t_2[i] |
| t_3[i] |

(b)

| focal_length_x[i] | radial_distortion[i] | principal_point_x[i] |
|-------------------|----------------------|----------------------|
| 0.0 | focal_length_y[i] | principal_point_y[i] |
| 0.0 | 0.0 | 1.0 |

(c)

METHOD AND APPARATUS FOR PROCESSING A 3D SERVICE

This application is a 35 USC §371 National Stage entry of International Application No. PCT/KR2012/005650 filed on Jul. 16, 2012, and claims priority of U.S. Provisional Application No. 61/508,079 filed on Jul. 15, 2011, which are hereby incorporated by reference in its entirety.

TECHNICAL FIELD

The present invention relates to a 3D (3-dimensional) service, and more particularly, to a method of processing a 3D service including a signaling to support a virtual 3D view of a random view and an apparatus therefore.

BACKGROUND ART

As the dissemination of a 3 dimensional television (3DTV) is raging, demand or interest for 3D service and a study for the 3D service are vitalized.

In general, a 3 dimensional video provides a 3D effect using a principle of stereo vision of two eyes. Since a human feels perspective via parallax of two eyes, in other word, binocular parallax due to a space between two eyes apart from each other about 65 mm, the 3D video may provide the 3D effect and the perspective in a manner of providing a video, which makes a left eye and a right eye see a related plane video, respectively.

The 3D video display method includes a stereoscopic technique, a volumetric technique, a holographic technique, and the like. In case of the stereoscopic technique, it provides a left view image supposed to be watched by a left eye and a right view image supposed to be watched by a right eye. The stereoscopic technique enables to recognize a 3D video effect in a manner of making the left eye and the right eye watch the left view image and the right view image respectively using a polarized glasses or a display device itself.

As mentioned in the foregoing description, a 3D broadcast delivers the left view image and the right view image, respectively. And, a broadcast receiver makes a 3D video in a manner of properly processing the left view image and the right view image. Hence, it is necessary to have signaling information to process a 3D broadcast signal.

Meanwhile, a limited 3D video in a fixed view can be received by a legacy 3DTV receiver. Hence, it is difficult for a viewer to freely select a preferred view. This sort of problem may cause a problem in multi-view broadcast or an auto stereoscopic 3DTV as well.

DISCLOSURE OF THE INVENTION

Technical Tasks

The present invention is devised to solve the aforementioned problem. In case of controlling a 3D effect while watching a 3D video, one of the technical tasks of the present invention is to control an intended 3D effect in a manner of generating and combining a new left view image and a right view image in a receiver.

Another task of the present invention is to restore 3D information on each of videos (L, R) using a depth map and a camera parameter for each of 2D videos (L, R) and to generate a video for a random view by performing a geometric projection.

The other task of the present invention is to provide a method of signaling information necessary for generating a 3D view of a random view, a method of processing a 3D service and an apparatus therefor.

Technical Solution

To achieve these and other advantages and in accordance with the purpose of the present invention, as embodied and broadly described, according to one embodiment, a 3D service device includes a receiving unit configured to receive a broadcast signal containing a 3D service, an SI processing unit configured to extract and decode SI information on the 3D service from the broadcast signal, a first processing unit configured to decode a 3D view data and a depth data, a second processing unit configured to generate a virtual view of a random view by an input of a decoded signal of the first processing unit based on the decoded SI information, and an output formatter configured to generate and output a 3D service data based on the virtual view of the random view generated by the second processing unit.

To further achieve these and other advantages and in accordance with the purpose of the present invention, according to a different embodiment, a method of processing a 3D service includes the steps of receiving a broadcast signal containing a 3D service, extracting and decoding SI information on the 3D service from the broadcast signal, decoding a 3D view data and a depth data, generating a virtual view of a random view by an input of a decoded signal based on the decoded SI information, and generating and outputting a 3D service data based on the generated virtual view of the random view.

Advantageous Effects

According to the present invention, first, a viewer can control an intended 3D effect using a 3D view of a random view while watching a 3D video.

Second, 3D information on each of videos (L, R) can be restored using a depth map and a camera parameter for each of 2D videos (L, R). And, a video for a random view can be generated by performing a geometric projection.

Third, a method of signaling information necessary for generating a 3D view of a random view, a method of processing a 3D service and an apparatus therefor can be provided.

DESCRIPTION OF DRAWINGS

FIG. 4 is a diagram for explaining an example of a view synthesis descriptor;

FIG. 5 is a diagram for explaining an example of a camera parameter;

FIG. 6 is a diagram for explaining an example of a PMT configuration including a view synthesis descriptor;

FIG. 8 is a diagram for explaining an example of a SDT configuration including a view synthesis descriptor;

FIG. 9 is a diagram for explaining an example of a method of transmitting view_synthesis_infor_data;

FIG. 10 is a diagram for explaining an example of a view synthesis info SEI message;

FIG. 11 is a diagram for an example of a view synthesis SEI descriptor;

FIG. 13 is a diagram for explaining a general warping depicted in FIG. 12;

FIG. 14 is a diagram for explaining a 1D parallel warping depicted in FIG. 12;

FIG. 15 is a diagram for explaining an example of a depth type;

FIG. 16 is a diagram for more specifically explaining a 1D parallel warping process;

FIG. 18 is a diagram for explaining a parameter detail of an $i^{th}$ camera in FIG. 17.

BEST MODE

Figure 1:
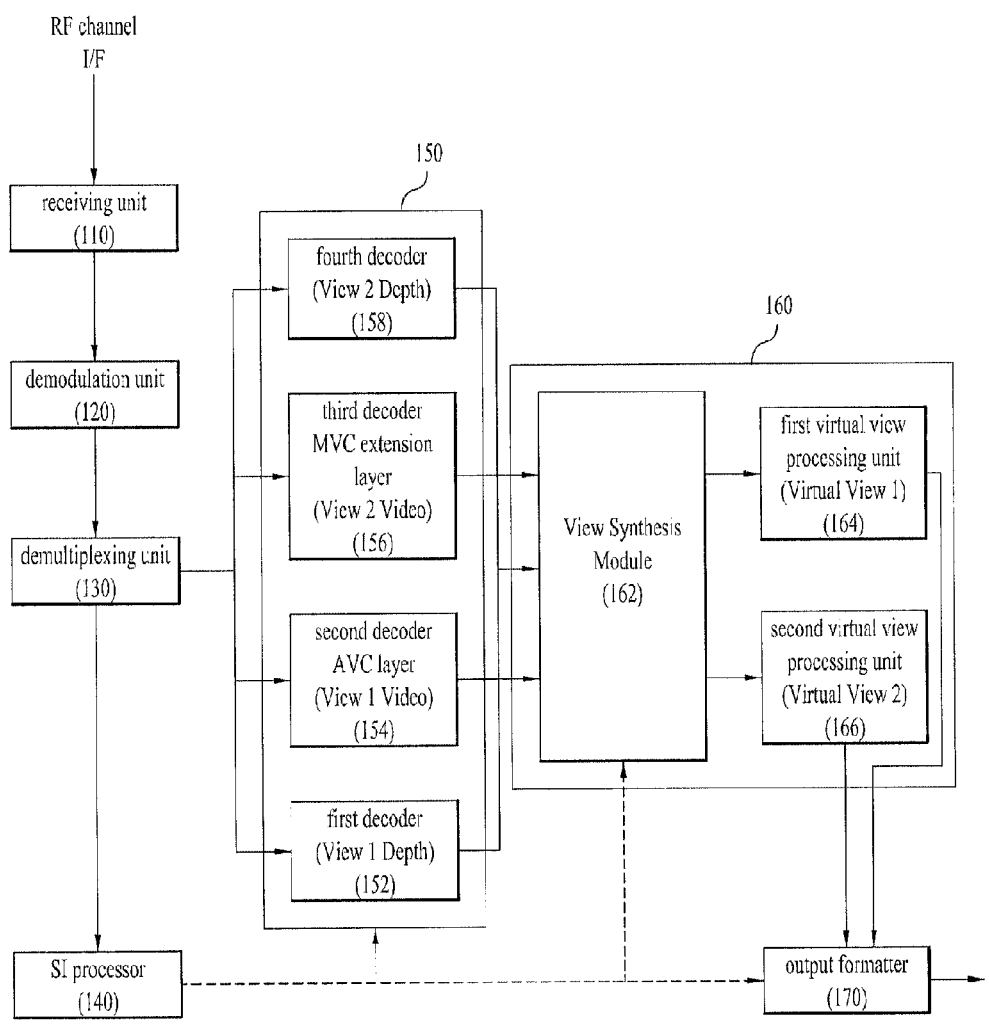
FIG. 1 is a diagram for explaining an example of a 3D broadcast receiver according to the present invention.

Reference will now be made in detail to the preferred embodiments of the present invention, examples of which are illustrated in the accompanying drawings. Yet, the present invention may be non-limited or non-restricted by the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

In a 3D system, a 3D service is generally formed in a manner that a transmitting side provides a video and information on a predetermined view and a receiving side provides a 3D video of a fixed view based on the corresponding video and information. In other word, most of receivers provide a 3D video of an identical or fixed view based on an identical video and information to a user.

This sort of 3D service is performed in one-way according to the intention of a content provider or a service provider without considering individual tastes, age, environment, performance of a receiver, and the like. Hence, the 3D service may degrade satisfaction of a user consuming the content or may give inconvenience to the user in a manner that the service is not properly implemented.

Hence, it is necessary for a user or a receiver to select a random view to appropriately control a 3D effect. Meanwhile, the aforementioned content can be applied to a multi-view broadcast or an auto stereoscopic 3D service as well.

The present specification describes the content providing a 3D view in a random view. For instance, 3D information on each of videos (L, R) can be restored using a depth map and a camera parameter for each of 2D videos (L, R) and a video for a random view can be generated by a geometric projection. To this end, the present specification provide a method of signaling information necessary for generating a 3D view in a random view, a method of processing a 3D service and an apparatus therefor. As an example, the present specification defines signaling information or service information (hereinafter signaling information) to perform a view synthesis in a corresponding part and specifically explains example(s) of the method of transmitting/receiving, i.e., signaling the signaling information. Yet, the method is described to help understanding of the present invention and ease explanation of the present invention. Hence, the technical idea of the present invention may be non-limited to the aforementioned embodiment.

As mentioned in the foregoing description, the present specification defines various variables and data required to generate a 3D view and intends to use them.

In the following description, signaling information of the present specification is mainly used for a 3D service of a virtual 3D view for a random view. For instance, the signaling information can be defined and/or used in (or interlocked with) such information used in relation to a broadcast service as PSI/PSIP (program specific information/program and system information protocol), DVB-SI (digital video broadcasting-service information), and the like.

Meanwhile, in the present specification, a device may indicate all digital devices processing a 3D service directly or indirectly by being connected with an external. Yet, for clarity, the present specification explains a broadcast receiver as an example. The digital device includes such a fixed device as a smart TV, an IPTV, and the like, such a mobile device as a smart phone, a tablet PC, a notebook and the like. And, the digital device includes all devices processing and/or outputting Blue Ray, a video CD, game, an application, software as well as a signal or content including a 3D service. Besides, the digital device can be interlocked with a different digital device via a network if necessary. And, a separate OS may be further installed in the digital device.

FIG. 1 is a diagram for explaining an example of a 3D broadcast receiver according to the present invention.

Referring to FIG. 1, a 3D broadcast receiver can include a receiving unit 110, a demodulation unit 120, a demultiplexing unit 130, an SI processor 140, a first processing unit 150, a second processing unit 160, and an output formatter 170.

The receiving unit 110 receives a 3DTV broadcast signal including a view image data for a 3D service and signaling information for the 3D service via an RF channel.

The demodulation unit 120 demodulates a received 3DTV broadcast signal.

The demultiplexing unit 130 demultiplexes a video data, an audio data, and a signaling data including the view image data from a modulated 3DTV broadcast signal and transmits it to a corresponding component.

The SI processor 140 receives the demultiplexed signaling data and processes the signal data. The processed signaling data is transmitted to the first processing unit 150, a view synthesis module 162, the output formatter 170, and the like and used for a processing of a corresponding component. Or, although it is not depicted in the drawing, the processed signaling data is temporarily stored in an SI database (DB) installed in an internal or external of the 3D broadcast receiver. For instance, among the processed signaling data, a signaling data for a video data of a base layer and an enhancement layer is transmitted to the first processing unit 150 and a signaling data for a 3D virtual view is transmitted to the second processing unit 160 by the SI processor 140.

The first processing unit 150 can include a first view processing unit and a second view processing unit. Meanwhile, the first view processing unit includes a first decoder 152 and a second decoder 154 and the second view processing unit includes a third decoder 156 and a fourth decoder 158. The first processing unit is mainly configured to process the aforementioned fixed view predetermined by the transmitting side.

The configuration of the first processing unit 150 can be variously implemented by an adaptive configuration according to a type of a 3D service. Yet, for clarity, the present specification explains the configuration for the 3D service data processing of the base layer and the enhancement layer as an example. The 3D service data of the base layer and the 3D service data for the enhancement layer are processed in the first view processing unit and the second view processing unit, respectively.

The second decoder 154 of the first view processing unit decodes a view image data of the base layer and the first decoder 152 decodes depth information on the view image data of the base layer decoded by the second decoder 154. In this case, the base layer may indicate that the view image data is AVC coded from an AVC layer.

The third decoder 156 of the second view processing unit decodes a view image data of the enhancement layer and the fourth decoder 158 decodes depth information on the view image data of the enhancement layer decoded by the third decoder 156. In this case, the enhancement layer may indicate that the view image data is MVC coded from an MVC extension layer.

As mentioned in the foregoing description, the first view image data/depth information, the second image data/depth information are generated via the first processing unit 150 and may be transmitted to the second processing unit 160 or the output formatter 170. Meanwhile, the first view image data/depth information and the second image data/depth information can be defined as a left view image data and a right view image data, respectively and vice versa.

And, the second processing unit 160 can include a view synthesis module 162, a first virtual view processing unit 164, and a second virtual view processing unit 166. Regarding this, it shall be described in detail in FIG. 2.

The output formatter 170 generates and outputs a 3D view data, which is synthesized according to an output frequency, via the left view image and the right view image received through the first processing unit 150 and the second processing unit 160.

In the foregoing description, the components configuring the 3D broadcast receiver can be implemented in a single component in a manner that pluralities of components are modularized in consideration of function, performance and the like of the components and vice versa.

And, although it is not depicted in FIG. 1, an OSD engine related to an OSD generation, a mixer, and the like can be further included in the 3D broadcast receiver. And, an output unit including a display and a speaker may be included inside or outside of the 3D broadcast receiver. The output unit can be connected with the 3D broadcast receiver via an HDMI interface and the like.

Figure 2:
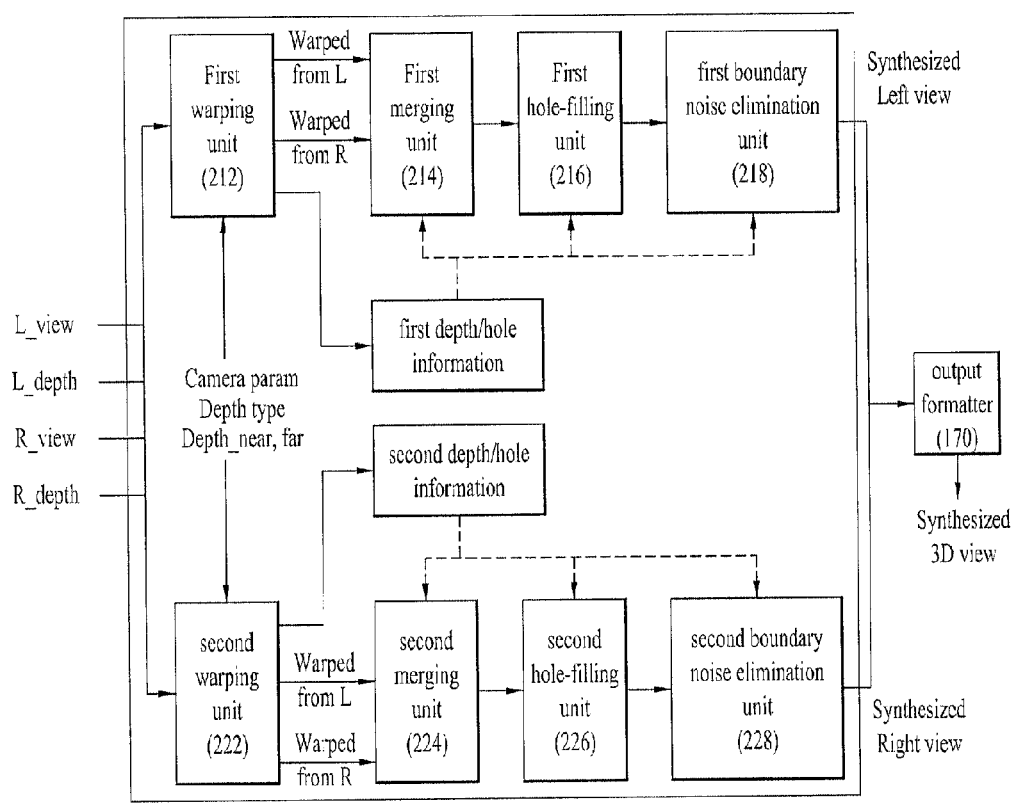
FIG. 2 is a detailed configuration block diagram of a view synthesis module 162 in a second processing unit 160 depicted in FIG. 1.

FIG. 2 is a detailed configuration block diagram of a view synthesis module 162 in a second processing unit 160 depicted in FIG. 1.

The second processing unit 160 can select a random view from a user and/or a receiver based on a left view image/ right view image delivered via the first processing unit 150 and signaling information. The second processing unit is a configuration to generate/process a 3D virtual view image data in the selected random view.

In the aforementioned FIG. 1, although the second processing unit 160 includes a view synthesis module 162, a first virtual view processing unit 164, and a second virtual view processing unit 166, FIG. 2 shows the view synthesis module 162 and an output formatter 170 only. Yet, it is apparent that the first virtual view processing unit 164 and a second virtual view processing unit 166 exist between the view synthesis module and an output formatter.

The view synthesis module 162 includes a first synthesis unit corresponding to the first virtual view processing unit 164 and a second synthesis unit corresponding to the second virtual view processing unit 166.

The first synthesis unit includes a first warping unit 212, a first merging unit 214, a first hole-filling unit 216 and a first boundary noise elimination unit 218. Meanwhile, the second synthesis unit includes a second warping unit 222, a second merging unit 224, a second hole-filling unit 226 and a second boundary noise elimination unit 228. Yet, for clarity of explanation of the present invention, the required configurations are depicted only. A part of configuration can be added or omitted if necessary.

Referring to FIG. 2, a process of generating a random 3D virtual view in the view synthesis module 162 is as follows. First of all, the warping unit performs a warping process for an inputted left view image data (L_view & L-depth) and a right view image data (R_view & R_depth) and generates data warped from the left view image data and data warped from the right view image data. The merging unit merges the data warped from the left view image data and the data warped from the right view image data. The hole-filling unit fills a hole(s). And then, the boundary noise elimination unit eliminates a noise of a boundary. Finally, a synthesized left view and a synthesized right view are generated.

In this case, the warping unit performs the warping process for each of the view image data based on at least one of a camera parameter, a depth type, a depth_near, a depth_far, and the like from view synthesis information described later.

And, the warping unit provides depth information and hole information to the merging unit, the hole-filling unit, and the boundary noise elimination unit and makes them use the depth information and the hole information in case of performing merging and hole(s) filling.

The generated synthesized left view and the synthesized right view undergo the first virtual view processing unit 164 and the second virtual view processing unit 166, respectively. And then, the views undergo the output formatter 170. By doing so, a synthesized 3D view of a random view is provided.

Meanwhile, the process of forming a synthesized 3D view in a random view is explained in FIG. 2. In relation to this, the warping, the merging, the hole-filling, and the boundary noise elimination process used in the aforementioned process are explained in more detail with reference to drawings described in the following description.

Figure 3:
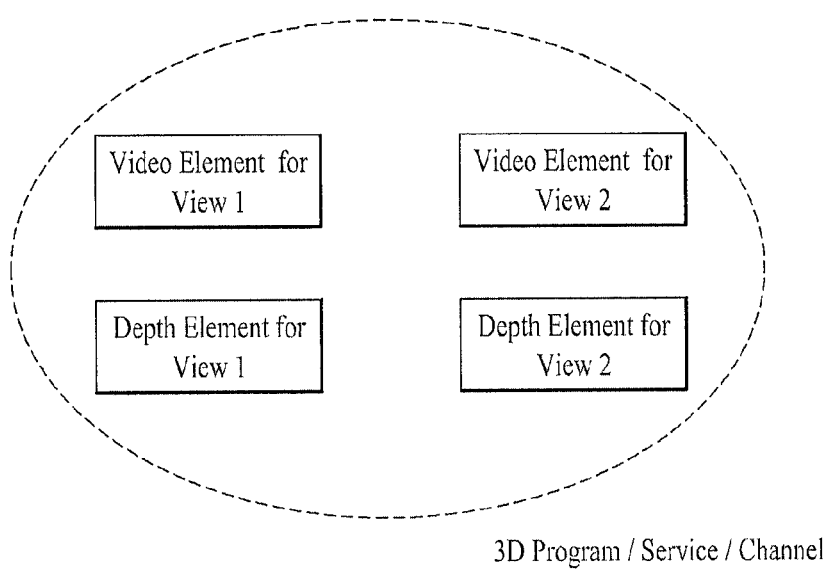
FIG. 3 is a diagram for explaining a configuration of a video and a depth element in relation to a virtual view synthesis.

FIG. 3 is a diagram for explaining a configuration of a video and a depth element in relation to a virtual view synthesis.

For instance, FIG. 3 shows an example of a broadcast service structure for a view synthesis in relation to the present invention. In this case, for instance, a 3D program/ service/channel can be configured with a video data and a depth data only.

FIG. 3 shows a video element for a first (virtual) view, a depth element for the first (virtual) view, a video element for a second (virtual) view, and a depth element for the second (virtual) view.

Yet, the broadcast service structure depicted in FIG. 3 is just an example, by which the present invention may be non-limited. It is apparent that the broadcast service structure depicted in FIG. 3 can be applied to a broadcast service structure added according to a technology enhancement as well as a broadcast service structure already announced in public.

FIG. 4 is a diagram for explaining an example of a view synthesis descriptor.

FIG. 4 defines signaling information required to generate a random 3D virtual view according to the present invention. The signaling information is called view synthesis information in the following description. For instance, the view synthesis information can be defined and transmitted in a manner of having compatibility with preconfigured SI informations.

Meanwhile, the view synthesis information can be defined as such various forms as a table, a descriptor, a field, and the like generally defined in SI. Yet, as an example, the present specification defines the view synthesis information in a descriptor form and explains the view synthesis information by naming it as a view synthesis descriptor.

For instance, the view synthesis descriptor is included in a PMT (program map table), a TVCT (terrestrial virtual channel table), an SDT (service description table), an EIT (event information table), and the like. The view synthesis information informs of 3D video acquisition information on a video stream or a depth stream included in a current program, a channel, or a service. This shall be described later.

For instance, the view synthesis descriptor provides information related to 3D acquisition for each of a left view and a right view and a 3D receiver provides information required to generate a virtual view for a random 3D view.

Meanwhile, if the view synthesis descriptor indicates information on each of the views, N corresponds to 1. In this case, the view synthesis descriptor provides information on a corresponding view only.

The view synthesis descriptor can indicate information on all views included in a program, a channel, or a service. In this case, N means the number of views actually transmitted.

In the following description, each field or element configuring the view synthesis descriptor is explained in more detail with reference to FIG. 4.

A descriptor_tag field and a descriptor_length field indicate that a present descriptor corresponds to the view synthesis descriptor. And, these fields inform of a length of the present descriptor.

A left_view_flag field indicates a view to which a following depth_type, a filter_coefficient, and the like are applied thereto. For reference, in case of a stereoscopic video service (N is equal to or less than 2), the present field indicates a left view and a right view. If the N is greater than 2, the present field should be greater than 1 bit and can be extended to indicate a relative position of a view. For instance, 0 may indicate a left-most view and a right view may be indicated as a number increases.

A depth_type field indicates a type of a transmitted depth map. A method for a receiver to process a depth map may vary according to the present field.

Meanwhile, fields below the depth_type field correspond to a loop structure and provide filter-related information according to the number of filter.

A filyer_type field indicates such a type of filter as a bilinear, a bicubic, and the like.

A filter_usage field indicates a case for which a corresponding filter is used. For instance, a value of the present filed can indicate whether a field is used for interpolation from an integer to a half-pel or used for interpolation from a half-pel to a quarter-pel.

A num_filter_tap field indicates the number of coefficient used for implementing a filter. A coefficient 1 (coeff1) and a coefficient 2 can be defined as many as the number of filter tap. In this case, for example, an actual coefficient value can be calculated by 'coeff1/coeff2' in relation to the defined coefficient 1 and the coefficient 2. Meanwhile, a filter coefficient can be represented by a decimal point unit of the coefficient value.

A filter_coefficient field for the aforementioned coefficient 1 and the coefficient 2 is a recommended coefficient used for implementing a filter in case of performing an integer, a half, or a quarter-pel interpolation in a pixel mapping process for a view synthesis.

Meanwhile, according to the aforementioned N, fields below the left_view_flag field and the depth_type field may have a loop structure.

A nearest_depth value field and a farthest_depth_value field indicate a depth range to give a physically meaningful Z value to a nominal value (e.g., 0~255) specified in a depth map.

A synthesis_mode field generally means such a view synthesis algorithm of a receiver as a general mode, 1D parallel mode, and the like. Yet, in this case, it can be defined as a profile concept for a transmitted parameter set. For instance, the present field may indicate that a necessary rotation matrix coefficient and the like are not transmitted in the general mode. This field may be represented as a full version, a simple version, or the like.

A multiview acquisition information SEI message can be utilized according to a synthesis_mode field. And, following fields and values can be determined according to the synthesis_mode field. For instance, if a value of the synthesis_mode field corresponds to 0x00, a camera_intrinsic_info( ) field depicted in FIG. 5 (a) and camera_extrinsic_info( ) field depicted in FIG. 5 (b) are defined. If a value of the synthesis_mode field corresponds to 0x01 or not 0x00, a focal_length field, a baseline_distance field, a principal_point_offset_distance field, and the like can be defined.

The camera_intrinsic_info( ) field and the camera_extrinsic_info( ) field are fields related to a camera parameter. When the synthesis_mode field corresponds to 0x00, these fields are meaningful and full parameter set is transmitted. If the synthesis_mode field corresponds to 0x01, a partial set is transmitted. Regarding the partial set, information on difference (difference in principal point offset) and the like can be transmitted from a focal length, a baseline distance, a principal point offset and the like.

In this case, a camera_parameter_id is assigned to the camera_intrinsic_info and the camera_extrinsic_info. And, a corresponding combination is stored in a receiver and may use it later. By doing so, since a parameter is not duplicately transmitted, bandwidth waste may be reduced.

A merge_option_included_flag field related to an option required to perform a view synthesis process. For instance, the present field can define a depth_threshold field and a hole_count_threshold field providing a parameter used in a view synthesis process as information capable of being selectively referred by a receiver according to a corresponding option value.

Figure 7:
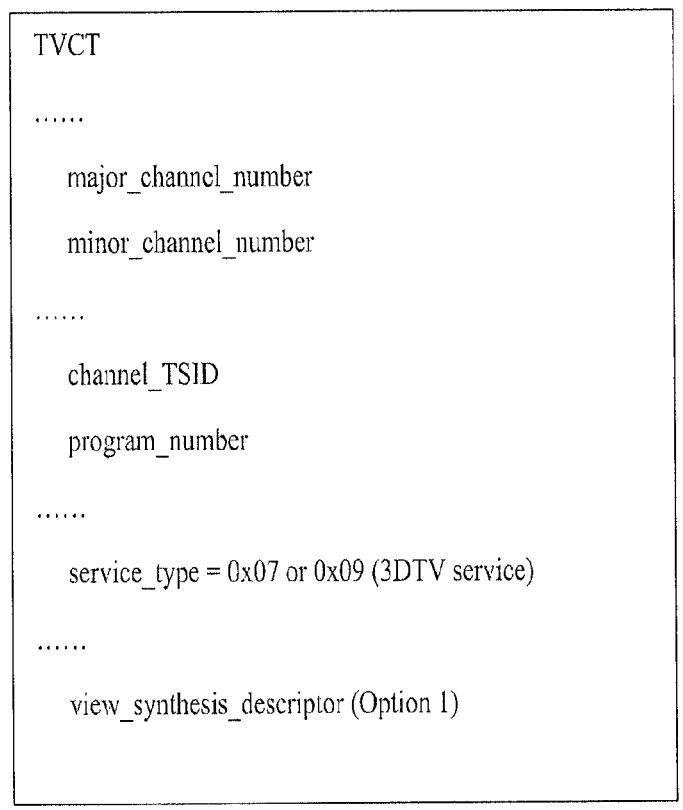
FIG. 7 is a diagram for explaining an example of a TVCT configuration including a view synthesis descriptor.

Meanwhile, as mentioned in the foregoing description, FIG. 6 to FIG. 8 shows an example of SI including a view synthesis descriptor according to the present invention. Each of the drawings explains the content including the view synthesis descriptor.

FIG. 6 is a diagram for explaining an example of a PMT configuration including a view synthesis descriptor.

In this case, FIG. 6 discloses a configuration or a field necessary for the view synthesis descriptor according to the present invention only. Yet, general content, a configuration, a field for a PMT, and detail explanation on the PMT may refer to the content and standard already announced in public. The detailed explanation on the PMT is omitted in the present specification.

If a view synthesis descriptor is positioned at the PMT, signaling can be performed in an elementary stream level corresponding to a depth stream as a first option. Or, signaling can be performed in an elementary stream level loop corresponding to a video elementary stream, which corresponds to a depth, as a second option.

Referring to FIG. 6, information on such various view streams as a video stream and a depth stream for a view can be included in a program, in particular, in a program including a program_number where it corresponds to 0x0002.

If a stream_type field value corresponds to 0x1B, it indicates an AVC coded video stream. This value indicates a base layer, i.e., a stream type for a first view. An elementary_PID of this video stream corresponds to 0x0090 and a view synthesis descriptor can be included in the video stream.

If the stream_type field value corresponds to 0x20, it indicates an MVC coded video stream. This value indicates an enhancement layer, i.e., a stream type for a second view. An elementary_PID of this video stream corresponds to 0x00A0 and a view synthesis descriptor can be included in the video stream.

If the stream_type field value corresponds to 0x26, it indicates the base layer, i.e., a depth stream for the aforementioned first view. An elementary_PID of this video stream corresponds to 0x0091 and a view synthesis descriptor can be included in the video stream.

If the stream_type field value corresponds to 0x26, it also indicates a depth scream. Yet, in this case, it may indicate the enhancement layer, i.e., the depth stream for the second view. Hence, an elementary_PID of this video stream corresponds to 0x0091 and a view synthesis descriptor can be included in the video stream.

As mentioned in the foregoing description, the view synthesis descriptor may be positioned at least one of a video stream and a depth stream according to the stream_type and the elementary_PID. In particular, the view synthesis descriptor can be defined and transmitted in a view unit or a stream unit.

FIG. 7 is a diagram for explaining an example of a TVCT configuration including a view synthesis descriptor.

Each configuration field configuring a general TVCT section is omitted in FIG. 7 with reference to the content and standard already announced in public. FIG. 7 explains on the content related to the present invention only.

If a view synthesis descriptor is transmitted in a manner of being included in a TVCT, the view synthesis descriptor can be positioned at a channel level descriptor loop as a first option. Or, fields of the view synthesis descriptor can be positioned at a conventional component list descriptor as a second option. Or, the fields of the view synthesis descriptor can be included in a service location descriptor in a manner of extending the service location descriptor as a third option.

Yet, if the view synthesis descriptor is included in the TVCT, the view synthesis descriptor is configured in a manner that information on all views is included in the TVCT.

TVCT section provides a channel number for a virtual channel via a major_channel_number field and a minor_channel_number field. The TVCT section is linked with a transmission stream ID for a channel via a channel_TSID field. The TVCT section is linked with a PAT (program association table) in a PSI and/or a program of the PMT via a program_number field, and the TVCT section provides service type information of a corresponding channel via a service_type field.

In this case, the service_type field in the TVCT according to the present invention includes a service type for a 3D service. For instance, if a value of the service_type field corresponds to 0x07 or 0x09, it may indicate that the service type transmitted via a corresponding channel is a 3DTV service. Meanwhile, the value of the service_type field is just an example and may be non-limited to the aforementioned field value.

As mentioned in the foregoing description, the view synthesis descriptor according to the present invention can be defined by one of the descriptors of the TVCT in FIG. 7. As an example, it is determined whether the view synthesis descriptor is included (defined) in the TVCT section according to the service_type field value. In particular, the view synthesis descriptor can be included in the TVCT section when a service type corresponds to the 3DTV service, which is indicated by the service_type field value. Or, the view synthesis descriptor can be transmitted in a manner of being included as a descriptor of the TVCT section when such a separate service type as a 3D virtual service is defined only. Besides, it may determine whether the view synthesis descriptor is included (transmitted) according to a channel unit and/or a program_number instead of a service unit.

FIG. 8 is a diagram for explaining an example of a SDT configuration including a view synthesis descriptor.

FIG. 8 shows an SDT section related to a service of a DVB scheme. Similar to FIG. 7, a view synthesis descriptor can be included in the SDT section.

If a view synthesis descriptor is transmitted to the SDT, the view synthesis descriptor is positioned at a service level descriptor loop and configured in a manner that information on all views is included in the view synthesis descriptor.

Meanwhile, as mentioned in the foregoing description, the view synthesis descriptor may be included in the SDT when a service identified by a service_id field corresponds to a 3D service only. Or, a service_id for a separate 3D virtual service is defined and the view synthesis descriptor can be included when an identifier for the defined 3D virtual service is transmitted only. Or, the view synthesis descriptor may be transmitted in a manner of being included in the SDT irrespective of the service_id.

Meanwhile, the remaining configuration fields depicted in FIG. 8 may refer to the content and the standard already announced in public. Hence, detailed explanation on the remaining fields is omitted.

Yet, the content on the service_id, the view synthesis descriptor, and the like may follow the content defined by a recent standard and/or the present specification.

FIG. 9 is a diagram for explaining an example of a method of transmitting view_synthesis_infor_data. FIG. 10 is a diagram for explaining an example of a view synthesis info SEI message.

Unlike the aforementioned description, video level signaling required to transmit information for a view synthesis is described in the following description. To this end, an example using an SEI message (view synthesis info SEI message) of a video stream or a video data header instead of PSI/PSIP/DVB-SI of a descriptor form is described in the following. The view synthesis info SEI message is intended to indicate view synthesis-related information in a video level.

Referring to FIG. 9, corresponding information is transmitted to a SEI (supplemental enhancement information) region in case of a H.264 (or AVC) video. A user_identifier and a user_structure are transmitted to a user_data_registered_itu_t_135( ) to make the user_data_registered_itu_t_135( ) include the user_identifier and the user_structure. In particular, the corresponding information is transmitted to SEI payloads instead of the user_data( ).

An SEI plays a role of picture extension and user data of MPEG-2 and may similarly constrain a position as well.

In particular, FIG. 9 indicates a method of transmitting a view synthesis information data in AVC/H.264.

FIG. 10 is a diagram for explaining an example of a view synthesis info SEI message.

Each of the configuration fields of the view synthesis info SEI message in FIG. 10 is explained in detail as follows.

A view_synthesis_info_id field includes an identifying number to identify an information combination included in the view synthesis info SEI message.

If a view_synthesis_info_cancel_flag corresponds to '1', it indicates that the view synthesis info applied to a previous picture is not applied anymore.

Since the content of the remaining configuration fields is identical to the aforementioned configuration field of FIG. 4, the aforementioned content is invoked here and duplicated explanation is omitted.

Meanwhile, a method of transmitting a view_synthesis_info_data to inform of the aforementioned view synthesis info SEI message, in particular, view synthesis-related information in a video level is as follows.

In case that a view synthesis info SEI message is included in a video data or a depth stream of a specific view, 3D information and the like for a corresponding stream view is signaled via the view_synthesis_info_data. A view_synthesis_info_data( ) is received via a SEI RBSP (raw byte sequence payload). After parsing AVC NAL unit, if a nal_unit_type value corresponds to 6, it indicates SEI data. A user_identifier value is checked in a manner of reading a user_data_registered_itu_t_t35 SEI message where a payloadType corresponds to 4. A data where a user_data_type_code corresponds to 0x12 is extracted in a manner of reading a user_structure( ) where the user_identifier value corresponds 0x4741 3934. 3D acquisition information and information configured to generate a virtual view later are obtained in a manner of parsing the view_synthesis_info_data( ).

FIG. 11 is a diagram for an example of a view synthesis SEI descriptor.

For instance, FIG. 11 is a diagram for an example of signaling whether a view synthesis info SEI message exists in a system level, which is signaled in a video level in the aforementioned FIG. 10.

Similar to FIG. 6, a view synthesis SEI descriptor can be positioned at an ES level and the like of the PMT. In order for a receiver to know whether a view synthesis info SEI message is included in a corresponding video in advance in a system level, signaling information is provided.

Referring to FIG. 11, the present descriptor includes configuration fields as follow.

A view_synthesis_info_SEI_message_exist_flag field indicates whether a view synthesis SEI message capable of specifically identifying view synthesis-related information is included in a received video stream.

Meanwhile, a full_synthesis_mode_supported_flag field can indicate a synthesis_mode value mentioned in the foregoing description.

Moreover, it is able to know in advance whether information included in the view synthesis info SEI message provides geometry information related to 3D acquisition fully or partially.

As mentioned in the foregoing description, in order to generate a 3D virtual view in a random view from a stream transmitted by a broadcast station, it may undergo following step(s).

Figure 12:
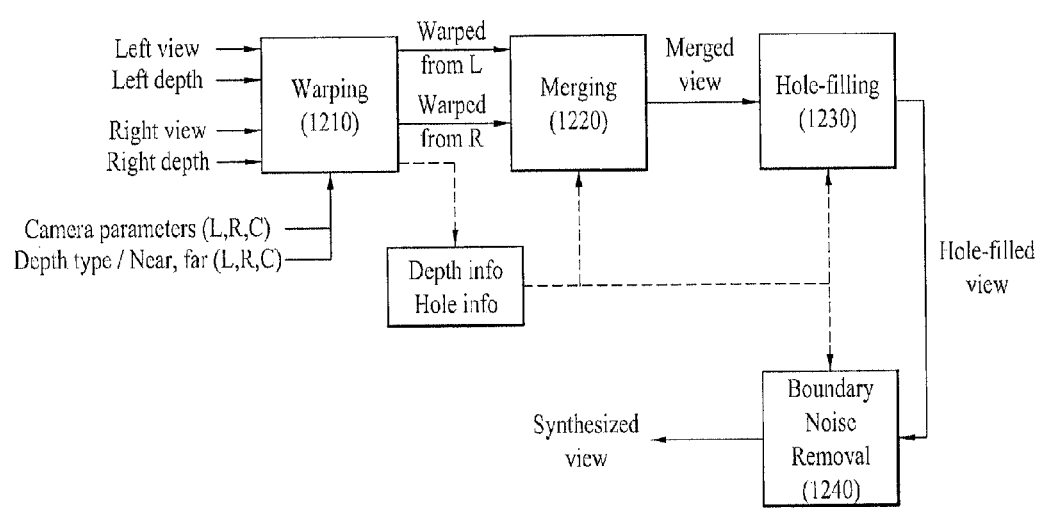
FIG. 12 is a diagram for explaining an example of generating a video of a random view in a view synthesis module 162 depicted in FIG. 2.

FIG. 12 is a block diagram for explaining an example of generating a video of a random view in a view synthesis module 162 depicted in FIG. 2.

First of all, a warping step is explained.

In this step, a warping is applied to each of a left video and a right video configuring a 3D view, respectively and mapping of a pixel unit is performed for a video of a new view.

There exist two types of warping. One is a general warping mode capable of performing for all camera configurations. Another is a warping mode (1D parallel warping mode) capable of performing for a 1D parallel camera configuration case only.

Meanwhile, the data inputted in a manner of being underwent the first processing unit 150 to perform a warping correspond to a left view (L video image), a left depth map (L depth map), a right view image (R video image), and a right depth map (R depth map).

Subsequently, when the warping step is done, a merging is performed.

This step is a process of making a video from the previously obtained two warped videos in a manner of combining a video (L') of a new view warped from the left view and a video (R') of a new view warped from the right view together.

In this case, in case of performing a merging, when a mapped pixel value exists in either the L' video or the R' video and the other side corresponds to a hole, a corresponding pixel can be filled with the existing pixel value.

And, both the L' video and the R' video correspond to a hole, a pixel of a merged view can be maintained as a hole.

Yet, if a mapped pixel value exists in both the L' video and the R' video, a value of one side is selected among two values or two values are used in a manner of being synthesized as one value. In this case, there may exist lots of selecting/synthesizing methods.

There may exist a method of using a depth value of a corresponding pixel, a method of using a camera baseline distance [pixel] when a pixel is mapped, a method of calculating reliability by measuring the number of holes in the vicinity of a pixel, and the like.

Subsequently, when the merging is done, a hole-filling step is performed.

This step is to generate a view in which a hole does not exist in a manner of filling holes remained in the previously generated merged view.

An appropriate value can be assigned in a manner of comprehensively considering at least one of a position of a hole, the number of holes in the vicinity of a pixel, a position of a pixel in the vicinity of a hole, a value of each pixel, and a depth value of a corresponding pixel. There exist various algorithms.

Lastly, when the hole-filling is done, a boundary noise elimination process is performed.

It is highly likely to have a boundary noise in a video generated in a manner of being undergone up to the hole-filling step. Hence, it is necessary to perform a process of eliminating a noise. To this end, a boundary noise elimination process is designed.

FIG. 13 is a diagram for explaining a general warping depicted in FIG. 12.

FIG. 13 shows a general warping process, which is one of the warping methods depicted in FIG. 12.

Referring to FIG. 13 (a), a general mode warping is a method of generating a video in a manner of projecting a pixel on a 2D space to a 3D space using a depth value of the corresponding pixel and geometry information of a camera captured the corresponding video and then projecting the projected pixel again to a new random 2D space.

In this case, M indicates a point on 3D world coordinate. m and m' indicate projections of M on the image planes. And, t and t' indicate centers of cameras.

FIG. 13 (b) indicates a formula to convert a point on a 2D space to a point on a 3D space.

On the contrary, FIG. 13 (c) indicates a formula to convert a point on a 3D space to a point on a 2D space.

In the aforementioned formula, P corresponds to a normalized perspective projection matrix, s and s' correspond to a scalar.

If two formulae are combined with each other, an interaction formula depicted in FIG. 13 (d) can be induced.

FIG. 14 is a diagram for explaining a 1D parallel warping depicted in FIG. 12.

FIG. 14 shows a 1D parallel mode warping method, which is one of the warping methods depicted in FIG. 12, different from the general warping method of FIG. 13.

Referring to FIG. 14 (a), the 1D parallel mode warping method is a method available when a limited condition that a camera arrangement is aligned to a 1D direction is satisfied only. The 1D parallel mode warping method is simpler than the general mode warping and is processed based on following three variables.

f, focal length
l, baseline spacing
du, difference in principal point

And, referring to FIG. 14 (b) and FIG. 14 (c), an actual depth value z is calculated from a given depth map, Z_near value, and a Z_far value and can be utilized.

Referring to FIG. 14 (d), a disparity value can be calculated from the three variables values. A pixel mapping is performed based on the disparity value.

Figure 17:
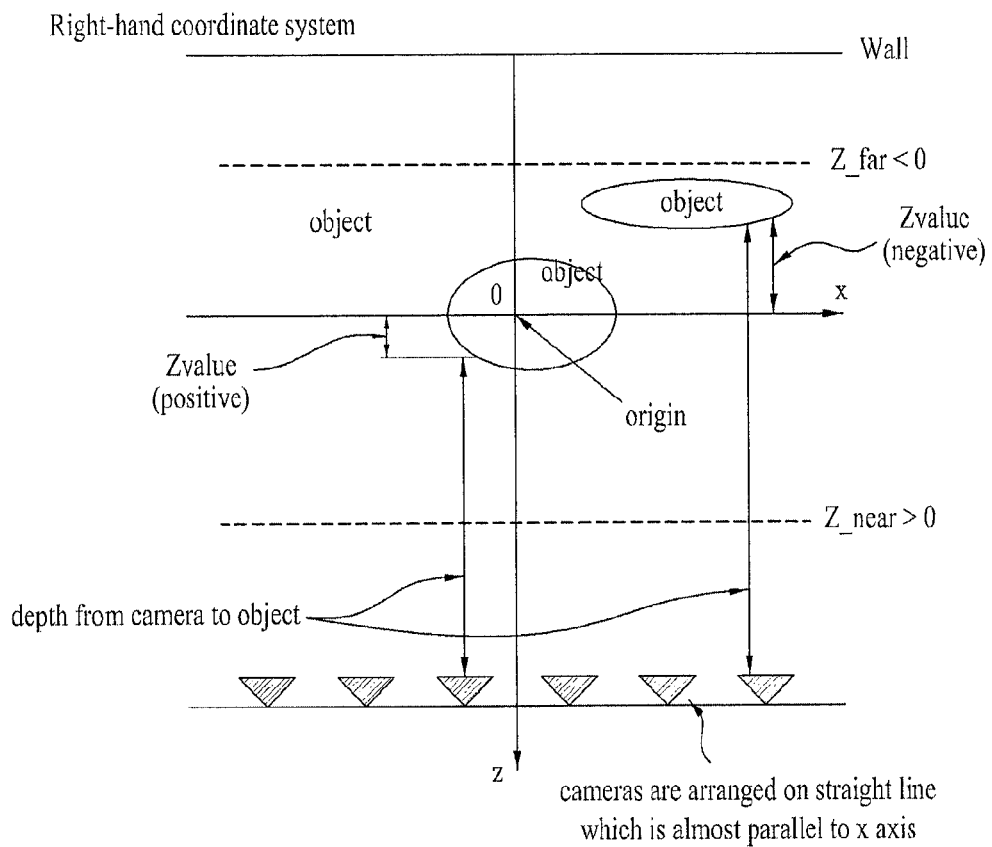
FIG. 17 is a diagram for explaining an example of a camera arrangement and Z value measurement.

FIG. 15 is a diagram for explaining an example of a depth type. FIG. 16 is a diagram for more specifically explaining a 1D parallel warping process. FIG. 17 is a diagram for explaining an example of a camera arrangement and Z value measurement. And, FIG. 18 is a diagram for explaining a parameter detail of an $i^{th}$ camera in FIG. 17.

Meanwhile, FIG. 15 to FIG. 18 more specifically explains parameters used in each of the steps in the aforementioned FIG. 12 according to the present invention.

First of all, setting process is explained.

A SynthesisMode field is a field explaining a view synthesis mode. The view synthesis mode includes a general mode, 1D parallel mode, and a hybrid mode. At least one of the view synthesis modes can be indicated by the present field. Meanwhile, the present field can indicates a full version and a light (simple) version as well.

A DepthType field is a field explaining a depth type.

FIG. 15 shows each characteristic according to the present field value, a range of a Z value, an equation for a depth and intensity (z–v), and an equation for intensity and a disparity (v–d). FIG. 16 schematically shows a method of performing the 1D parallel warping according to the depth type. In this case, for instance, FIG. 16 (a) shows a case that a depth_type corresponds to 0 and FIG. 16 (b) shows a case that the depth_type corresponds to 1.

As depicted in FIG. 15 and FIG. 16 (a), if the depth_type field value corresponds to 0, it means the view synthesis mode using depth from a camera. In this case, a depth value can take a negative value as well as a positive value from the origin of 3D space. It is applicable to any 1D parallel image.

As depicted in FIG. 15 and FIG. 16 (a), if the depth_type field value corresponds to 1, it also means the view synthesis mode using depth from a camera. In this case, the depth value takes only a positive value from the origin of 3D space. It is applicable to only images that any object has positive depths from the origin of 3D space.

Meanwhile, FIG. 17 shows a camera arrangement and Z value measurement in relation to the present invention.

Referring to FIG. 7, at least one of combinations can be made out of a filter_usage, a filter_type and a filter_coefficient field. In particular, the filter_usage field indicates the timing to which a corresponding filter is applied.

The filter_usage field is a field indicating the timing to which a corresponding filter is applied. This field is used for indicating such various usages as a case of performing upsampling a half-pel region to a quarter-pel region, a case of performing upsampling an integer-pel region to a quarter-pel region, and the like.

The filter_type field indicates an upsampling filter to generate image signals on sub-pixel positions. If a value of the present field corresponds to 0, it means a (bi-) linear filter. If a value of the present field corresponds to 1, it means a (bi-) cubic filter. If a value of the present field corresponds to 2, it may mean a filter used in MPEC-4 AVC.

The filter_coefficient field indicates a filter coefficient used for a filter.

After the setting process, the warping process is explained in more detail.

A NearestDepthValue field specifies the nearest depth value of a left image from a camera or the origin of 3D space.

A FarthestDepthValue field specifies the farthest depth value of a left image from a camera or the origin of 3D space.

In case of performing the warping process, the general mode needs all relevant camera parameter informations. A camera parameter is given in a file form. A parameter of a preferred camera can be used in a manner of being brought based on a name (identifier) of the preferred camera within the file.

A camera parameter is configured by at least one selected from the group consisting of a rotation matrix R of FIG. 18 (a), a translation vector t of FIG. 18 (b), an intrinsic matrix A of FIG. 18 (c), and the like.

A CameraParameterFile field specifies the file name (with the .txt) of the file which includes intrinsic and extrinsic parameters of all cameras at real and virtual views.

A LeftCameraName field specifies the name of a real camera at the left hand side of a specified virtual viewpoint camera.

A VitualCameraName field specifies the name of a virtual viewpoint camera to be generated view images.

A RightCameraName field specifies the name of a real camera at the right hand side of a specified virtual viewpoint camera.

In case of performing the warping process, the 1D parallel mode needs following informations for each of a left video and a right video.

A focal_length field specifies a focal length of a camera.

A baseline_spacing field specifies a distance (i.e., a distance between a view of a possessed L or R video and a view of a video to be generated) between cameras.

A difference_in_principal_point_offset field specifies a difference between a principal point offset of a possessed L or R camera and a principal point offset value of a video camera to be generated.

After the warping process, the merging process is explained in more detail.

Following fields correspond to values capable of being selectively sent by a broadcast station to enable a receiver to refer to the values in case of performing the merging process.

A DepthThreshold field is a valid parameter only when MergingOption is set to 2. It is used in the heuristic blending algorithm. A larger value means more pixels are averaged. Generally, a larger value is expected with a depth map of poor quality. Regarding this, refer to MPEG document M15883 for more details.

A HoleCountThreshold field is a valid parameter only when MergingOption is set to 2. It is used in the heuristic blending algorithm. A larger value means less pixels are averaged. Regarding this, refer to MPEG document M15883 for more details.

Meanwhile, in case of performing the merging, following methods are available. When a pixel gets mapped from both the left and the right reference view, a blending method need to be applied to decide the final pixel value.

A value of a pixel closer to a camera is assigned after comparing with a z-buffer. The pixel closer to camera is always selected.

A hole-count is performed for neighboring pixels and then a value of a pixel including a less hole is assigned. (less hole high reliability)

After comparing a baseline distance, a value of a pixel of a closer distance is assigned. If a virtual viewpoint is near to a left viewpoint, a left view image is used, and vice versa.

In this case, either a left or a right view image is primarily used and holes are filled with the other image.

A new pixel value made by combining two pixel values with each other is used. As a representative method, averaging and the like can be used.

MODE FOR INVENTION

As mentioned in the foregoing description, various embodiments of the present invention are explained in the aforementioned best mode for the invention.

INDUSTRIAL APPLICABILITY

The present invention can be industrially utilized in a manner of being partially or totally applied to a digital system.

What is claimed is:

1. A 3D service device, comprising:
   a receiving unit to receive a broadcast signal containing a 3D service, the 3D service including 3D view data and depth data of a first view point, and view synthesis information transmitted by at least one of a program map table (PMT), a terrestrial virtual channel table (TVCT), or a service description table (SDT);
   a service information (SI) processing unit to extract and decode the view synthesis information on the 3D service from the broadcast signal;
   a first processing unit to decode the 3D view data and the depth data of the first view point;
   a second processing unit to generate 3D view data of a second view point by using the 3D view data and the depth data of the first view point and the view synthesis information,
   wherein the second view point is a random view point selected by a receiver from the first view point; and
   an output formatter to generate and output 3D service data based on the 3D view data of the second view point generated by the second processing unit.

2. The device of claim 1, wherein the view synthesis information includes
   depth type information indicating a type of a transmitted depth map,
   synthesis mode information indicating a transmitted parameter set,
   camera information indicating a full parameter set or a partial parameter set, and
   camera identification information indicating a combination of parameter set.

3. The device of claim 2, wherein the view synthesis information is signaled in at least one of an elementary stream level corresponding to a depth stream or in an elementary stream level loop corresponding to a video elementary stream if the view synthesis information is transmitted by the PMT.

4. The device of claim 2, wherein the view synthesis information is signaled in at least one of a channel level loop, component level, or service level if the view synthesis information is transmitted by the TVCT.

5. The device of claim 2, wherein the view synthesis information is signaled in a service level loop if the view synthesis information is transmitted by the SDT.

6. The device of claim 1, wherein the 3D view data or the depth data includes a supplemental enhancement information (SEI) message which has the view synthesis information,
   wherein the view synthesis information further includes
      an identifying number for identifying information included in the SEI message, and
      a cancel flag indicating the view synthesis information is information used for a previous picture.

7. The device of claim 6, wherein the view synthesis information included in the SEI message further includes
   an exist flag indicating the SEI message for the view synthesis information is included, and
   a support flag indicating a synthesis mode.

8. A method of processing a 3D service, comprising:
   receiving a broadcast signal containing a 3D service, the 3D service including 3D view data and depth data of a first view point, and view synthesis information transmitted by at least one of a program map table (PMT), a terrestrial virtual channel table (TVCT), or a service description table (SDT);
   extracting and decoding the view synthesis information on the 3D service from the broadcast signal;
   decoding the 3D view data and the depth data of the first view point;

generating 3D view data of a second view point by using the 3D view data and the depth data of the first view point and the view synthesis information, wherein the second view point is a random view point selected by a receiver from the first view point; and generating and outputting 3D service data based on the 3D view data of the second view point.

9. The method of claim 8, wherein the view synthesis information includes depth type information indicating a type of a transmitted depth map, synthesis mode information indicating a transmitted parameter set, camera information indicating a full parameter set or a partial parameter set, and camera identification information indicating a combination of parameter set.

10. The method of claim 9, wherein the view synthesis information is signaled in at least one of an elementary stream level corresponding to a depth stream or in an elementary stream level loop corresponding to a video elementary stream if the view synthesis information is transmitted by the PMT.

11. The method of claim 9, wherein the view synthesis information is signaled in at least one of a channel level loop, component level, or service level if the view synthesis information is transmitted by the TVCT.

12. The method of claim 9, wherein the view synthesis information is signaled in a service level loop if the view synthesis information is transmitted by the SDT.

13. The method of claim 8, wherein the 3D view data or the depth data includes a supplemental enhancement information (SEI) message which has the view synthesis information, wherein the view synthesis information further includes an identifying number for identifying information included in the SEI message, and a cancel flag indicating the view synthesis information is information used for a previous picture.

14. The method of claim 13, wherein the view synthesis information included in the SEI message further includes an exist flag indicating the SEI message for the view synthesis information is included, and a support flag indicating a synthesis mode.

* * * * *